(12) United States Patent
Kristiansson et al.

(10) Patent No.: US 10,761,881 B2
(45) Date of Patent: Sep. 1, 2020

(54) MANAGING A LIFECYCLE OF A SOFTWARE CONTAINER

(71) Applicant: Telefonaktiebolaget LM Ericsson (publ), Stockholm (SE)

(72) Inventors: Johan Kristiansson, Luleå (SE); Daniel Bergström, Luleå (SE); Jonas Lundberg, Luleå (SE); Nicklas Sandgren, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 16/306,927

(22) PCT Filed: Jun. 28, 2016

(86) PCT No.: PCT/SE2016/050650
§ 371 (c)(1),
(2) Date: Dec. 4, 2018

(87) PCT Pub. No.: WO2018/004403
PCT Pub. Date: Jan. 4, 2018

(65) Prior Publication Data
US 2019/0146833 A1 May 16, 2019

(51) Int. Cl.
*G06F 9/455* (2018.01)
*G06F 9/48* (2006.01)
*G06F 16/22* (2019.01)

(52) U.S. Cl.
CPC .......... *G06F 9/485* (2013.01); *G06F 9/4881* (2013.01); *G06F 16/2255* (2019.01)

(58) Field of Classification Search
None
See application file for complete search history.

(56) References Cited

U.S. PATENT DOCUMENTS

| | | |
|---|---|---|
| 8,539,073 B1 | 9/2013 | Dayan |
| 8,966,464 B1 | 2/2015 | Christopher et al. |
| 9,256,467 B1 * | 2/2016 | Singh ............... G06F 9/5055 |
| 2016/0147529 A1 | 5/2016 | Coleman et al. |

FOREIGN PATENT DOCUMENTS

| | | |
|---|---|---|
| WO | 2015171030 A1 | 11/2015 |
| WO | 2016195562 A1 | 12/2016 |

OTHER PUBLICATIONS

Schulz, Sven, et al., "Cohesion—A microkernel based Desktop Grid platfOim for irregular task-parallel applications", Future Generation Computer Systems 24, May 2008, 354-370.

\* cited by examiner

*Primary Examiner* — Gregory A Kessler
(74) *Attorney, Agent, or Firm* — Sage Patent Group

(57) ABSTRACT

It is provided a method for managing a lifecycle of a software container announced in a distributed peer-to-peer repository, wherein the method is performed in a server. The method comprises the steps of: initialising execution of the software container in the server; setting the software container in a standby state; receiving a start message from a remote device, the start message comprising at least one start parameter for the software container; and starting a main process of the software container and applying the at least one start parameter for the main process, to progress the software container to a running state.

16 Claims, 4 Drawing Sheets

MANAGING A LIFECYCLE OF A SOFTWARE CONTAINER

TECHNICAL FIELD

The invention relates to methods, a server, computer programs and computer program products for managing a lifecycle of a software container.

BACKGROUND

Recently, microservices have become a popular architecture to build modern distributed applications, such as Web services or other distributed applications. By breaking down a complex monolithic application into small independent services it becomes possible to develop services that are more resilient to error and more scalable. For example, if a particular microservice would fail, it would not affect the entire service. However, if a component part of a monolithic service would fail, the entire service would have to be restarted. Also, the only way to scale a monolithic service is to duplicate the whole monolith by adding more instances of it. In a microservice based architecture on the other hand, only the services that need to be scaled need to be duplicated.

Software containers are commonly used to implement microservice-based architectures and make sure services can run independently of each other. In contrast to virtual machines, software containers are more lightweight and can instantly be started, similar to standard Unix processes, assuming the server has all images required to start the container. Another advantage is that software containers provide a reliable execution environment allowing developers to develop and test their services locally on their machine and then upload the image to a cloud platform and still be sure the containers behave similarly as running them locally.

Docker is an example of a container runtime that has recently gained popularity. By allowing container images to be stacked in a so-called union file system, container images can more efficiently be distributed.

However, when adopting a microservice based container architecture, designers and developers still need to figure out how to manage the lifecycle of individual components, for example when to start a new service, when to scale it, how to handle fault recovery and so on.

Additionally, a general problem with current container based architectures is that it takes time to start new containers. This is particularly a problem when using cluster management platforms such as Apache Mesos where the start-up delay can vary from a couple of seconds up to several minutes depending if the selected server in the cluster already has the necessary container images required to start the container in local storage or not. Without taking precautionary actions, a fresh new server added to the cluster has typically no container images at all, and will thus cause a significant delay.

From a user perspective, the service should start without noticeable delay or at least with acceptable delay. To give a perspective, a common practice is to minimize the size of JavaScript code loaded by Web browser to reduce start-up delays. Waiting several minutes for deploying a container would in many cases not be a practical solution. Consequently, adopting a design principle where containers are started on demand would not be possible in such a case. Still, the container may need to be customised for the particular session.

SUMMARY

It is an object to manage a lifecycle of a software container to provide quick response when a new software container is needed, while still allowing customisation of the software container.

According to a first aspect, it is provided a method for managing a lifecycle of a software container announced in a distributed peer-to-peer repository, the method being performed in a server. The method comprises the steps of: initialising execution of the software container in the server; setting the software container in a standby state; receiving a start message from a remote device, the start message comprising at least one start parameter for the software container; and starting a main process of the software container and applying the at least one start parameter for the main process, to progress the software container to a running state.

The step of initialising comprises downloading an image file for the main process when needed.

The step of starting the main process may be performed after step of receiving the start message.

The method may further comprise the steps of: calculating a lookup key associated with the software container; and storing an address of the server in association with the lookup key in the distributed peer-to-peer repository.

The distributed repository may be based on a distributed hash table.

The method may be performed in a staging process being distinct from the main process.

In one embodiment, the step of starting the main process is only performed once a mandatory set of at least one start parameter has been received.

According to a second aspect, it is provided a server for managing a lifecycle of a software container announced in a distributed peer-to-peer repository. The server comprises: a processor; and a memory storing instructions that, when executed by the processor, causes the server to: initialise execution of the software container in the server; set the software container in a standby state; receive a start message from a remote device, the start message comprising at least one start parameter for the software container; and start a main process of the software container and applying the at least one start parameter for the main process, to progress the software container to a running state.

The instructions to initialise may comprise instructions that, when executed by the processor, causes the server to download an image file for the main process when needed.

The server may further comprise instructions that, when executed by the processor, causes the server to execute the instructions to start the main process after the instructions to receive the start message.

The server may further comprise instructions that, when executed by the processor, causes the server to: calculate a lookup key associated with the software container; and store an address of the server in association with the lookup key in the distributed peer-to-peer repository.

The distributed repository may be based on a distributed hash table.

The instructions may be performed in a staging process being distinct from the main process.

The instructions to start may comprise instructions that, when executed by the processor, causes the server to start the main process only once a mandatory set of at least one start parameter has been received.

According to a third aspect, it is provided a server comprising: means for initialising execution of a software container in the server, the software container announced in a distributed peer-to-peer repository; means for setting the software container in a standby state; means for receiving a start message from a remote device, the start message comprising at least one start parameter for the software container; and means for starting a main process of the software container and applying the at least one start parameter for the main process, to progress the software container to a running state.

According to a fourth aspect, it is provided a computer program for managing a lifecycle of a software container announced in a distributed peer-to-peer repository. The computer program comprises computer program code which, when run on a server causes the server to: initialise execution of the software container in the server; set the software container in a standby state; receive a start message from a remote device, the start message comprising at least one start parameter for the software container; and start a main process of the software container and applying the at least one start parameter for the main process, to progress the software container to a running state.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
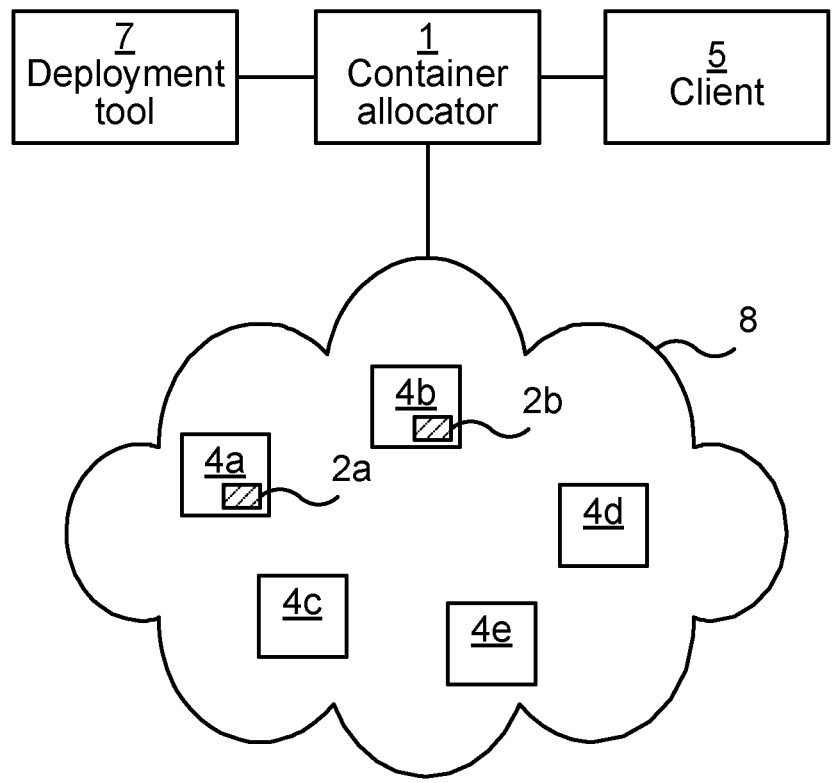
FIG. 1 is a schematic drawing illustrating an environment in which embodiments presented herein can be applied.

FIG. 1 is a schematic drawing illustrating an environment in which embodiments presented herein can be applied.

There are here a number of servers 4a-e forming part of a set 8 of servers. While there are five servers 4a-e shown here, the set 8 of servers can contain any suitable number of servers. Each one of the servers 4a-e can execute software containers when required, as described in more detail below.

For instance, the software containers can be containers running on a Docker platform. The software containers contain software being distributed as image files (images are here not to be confused with illustrations/photographs). Moreover, a method called process injection is used to transparently add additional processes into the container and then modify the boot order. This makes it possible to inject management processes into the containers, for example staging processes allowing lifecycle management of the software containers.

Figure 3:
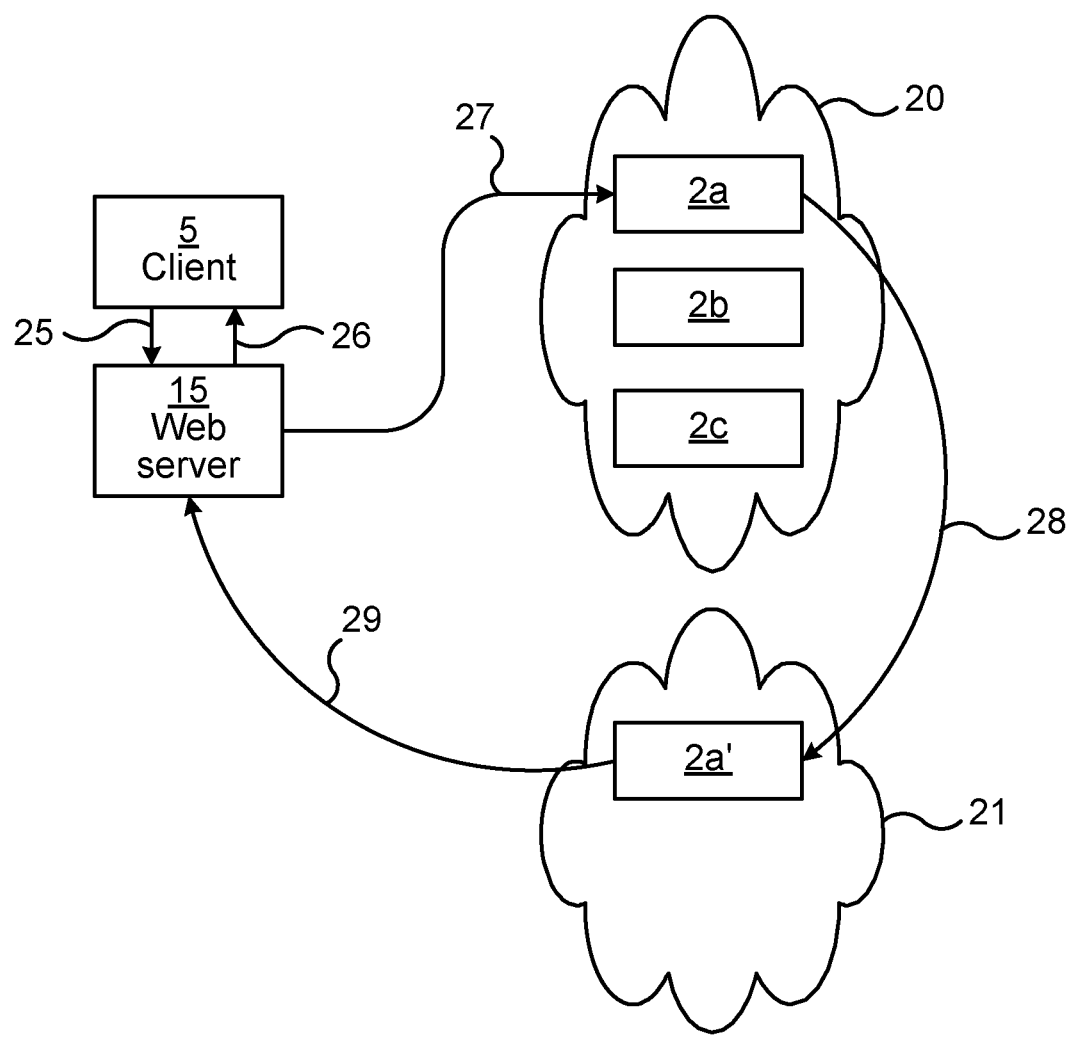
FIG. 3 is a schematic drawing illustrating lifecycle of a software container of FIGS. 1 and 2.

Process injection can also be used to inject a process for an allocation agent and a staging agent in the software container. The allocation agent communicates with a container allocator 1 to assist in the allocation of software containers to one or more clients 5. Each client 5 is thus enabled to make use of a software container. The staging agent is used to manage the lifecycle of the software container, allowing the software container to move to a standby state and a running state, as shown in FIG. 3 and explained in more detail below. It is to be noted that each client can also be a server for another context; it is only in relation to a software container described here that the client 5 is a client.

A deployment tool 7 is used when new software containers are to be deployed. The deployment tool 7 communicates with the container allocator 1 for the deployment.

The set of servers 8 is organised in a decentralized peer-to-peer network, which can be implemented on an underlying network, such as an IP (Internet Protocol) network. Some of the software containers in the network are in a standby state, explained in more detail below, where the software container is initialised but not allocated or customised to a particular session. The software containers in standby state can be discovered by clients 5 using the container allocator 1 such that once they have been discovered it is ensured that the software container is not allocated multiple times by other clients. The software containers are already initialised, which includes downloading image files when needed, whereby the start up time when a client requests a software container is minimal. This mechanism makes it possible to implement transient containers, which are containers allocated on demand to clients and only exist for a limited amount time.

Once the client 5 releases communication with the server, the execution of the software container ends. Each software container here executed an instance of a software image. Using the peer-to-peer network, the presented embodiment is decentralized; meaning that there is no directory service or central controller that is responsible for allocation. Every server in the network is equal, and it is the network itself which provides the proposed discovery mechanism to allocate containers. Hence, there may be several container allocators 1 executing in parallel for the same set of servers 8.

To provide the decentralized solution, the proposed discovery algorithm can be based on a Distributed Hash Table (DHT) algorithm, such as Kademlia, Chord or Pastry.

The allocation agent which is injected at deployment connects to the peer-to-peer network 8 and publishes a lookup key which can be checksum (e.g. SHA (Secure Hash Algorithm)-1) of a blueprint for the software container and information how to connect to the allocation agent. The blueprint contains information such or metadata of the image, e.g.: {"container": {"image": "docker:///sample-dockerregistry.foo.com:443/videoconf"}}, here containing container image(s) URL (Uniform Resource Locator), etc. needed to start the container. The blueprint may optionally contain additional metadata, such as version numbers or memory or CPU constraints. The blueprint may also be a reference, a checksum (such as Secure Hash Algorithm 1 (SHA-1)) or another identifier (e.g. UUID (Universally Unique Identifier)) as long as the underlying system can resolve the identifier and retrieve information on how to deploy the containers.

When a client 5 needs the services of a software container executing a particular functionality (provided using the software image), the container allocator 1 calculates the checksum (being the lookup key) of a blueprint of the requested image and performs a lookup of the checksum in the peer-to-peer repository implemented e.g. by the DHT. In this way, the container allocator discovers the allocation agents of the software containers matching the specified blueprint. The container allocator 3 then selects an allocation agent and tries to connect to it. The selection can be random. An allocation agent will only accept one single connection during its lifetime, and a container is successfully allocated to a particular client 5 if the Container Allocator managed to connect to the selected Allocation Agent.

Different instances of the same software container can execute in parallel on different servers to thereby achieve transient containers. In FIG. 1, a first software container 2a is in standby mode, i.e. initialised and ready to be allocated, on a first server 4a. In parallel, a second software container 2b is in standby mode on a second server 4b. The second software container 2b is an instance of the same image which is used for the first software container 2a. Hence, their blueprints are the same and their checksums are the same.

This structure allows the use of transient containers, where software containers are allocated on demand, for example triggered by an external event such as a user loads a particular web page (URL).

The client 5 can be any suitable type of client. One non-limiting example is that the client 5 could be a client for a communication session, e.g. in accordance with Matrix.org which is an open standard for a protocol that can be used to set up communication sessions, where each session corresponds to an online virtual room. When users enter a virtual room (e.g. by opening a URL in a web browser) they will join the meeting or conference to meet other participants connected to the same room. Using embodiments presented herein, the software can be initialised in the standby state without having an assigned room. Once a client connects and the main process is started, it is then provided with a room identifier. The main process is the process that performs the desired user function of the software container, i.e. not managing the software container itself.

An interesting characteristic of an online virtual room is that resources connected to a room (e.g. a video conferencing service or a data synchronization service) only need to be allocated as long as there are participating users. Using the structure provided here, all needed resources can be allocated on demand, for example by starting all needed containers when the first user join the room, and then stop all containers when all users have left. The concept of transient containers could therefore be an efficient design principle for implementing online video conferencing services.

Using the embodiment of FIG. 1, it is possible to more or less instantly start containers and also provide start parameters, whereby it is possible to use transient containers as a design pattern to more efficiently implement new Internet services and applications.

As a container is created on demand when needed and only exists for a limited time, it is very easy to scale a service by adding more hardware, for example adding more servers to the set of servers 8 (peer-to-peer network).

This architecture supports great scalability and can support massive amounts of servers.

If a transient container crashes, it will not affect the entire service, but only the clients connected to the container that crashed are affected. Also, as the containers are never reused, a client will always connect to a fresh instance. This eliminates effects of software bugs such as memory leaks that could otherwise drain computational resources over time.

As transient containers are shutdown after being used, all states stored in the container are lost, making it harder to hack the system to retrieve historical data.

It becomes possible to introduce a new version of particular container without affecting previously running sessions, e.g. a videoconference session. The videoconference session will eventually be upgraded once all users have left the conference and then join the same conference room at a later occasion. Also, all new conference sessions will immediately start using the new containers images once they have been introduced. Again, this will not affect already running sessions.

Figure 2:
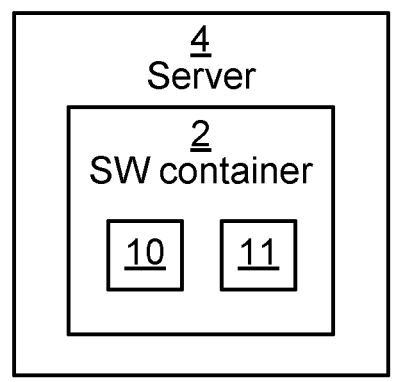
FIG. 2 is a schematic drawing illustrating a server shown in FIG. 1.

FIG. 2 is a schematic drawing illustrating a server 4 shown in FIG. 1. The server 4 can be any of the servers 4a-e shown in FIG. 1.

The server 4 comprises one or more software containers 2. Each software container 2 contains the image file 13, containing the software code to run the main process of the software container. Moreover, each software container 2 contains a staging agent 10, an allocation agent 11, both injected at deployment and a peer-to-peer repository 12. The peer-to-peer repository can be implemented using DHT as described above. In other words, the staging agent and the allocation agent do not form part of the main process.

Now an embodiment of the peer-to-peer network for the servers will be described based on Bitverse. Bitverse is a framework to build decentralized peer-to-peer application. Bitverse is based on the Kademlia DHT algorithm and provides a messaging API (Application Programming Interface) and a key value store API. In both APIs, self-generated SHA-1 strings are used to identify node end-points and data objects. Bitverse is thus a DHT implementation of a decentralised repository.

Bitverse consists of two different types of nodes, super nodes and edge nodes. Edge nodes are connected using web sockets to a super node and thus forms a star topology. An edge node can either run as a library in a web browser client or in a server component directly.

Super nodes communicate using UDP (User Datagram Protocol). Messages are routed using a routing table provides by Kademlia. The routing table consists of 160 buckets where each bucket contains a limited list of contacts (typically 20) discovered by the super node. XOR (Exclusive OR) is used to determine the distance between two different nodes in the network and which bucket a contact should be stored in. This makes it possible to implement an iterative protocol where a node calculates which contacts in its routing table that has the shortest distance to a particular string, or the SHA-1 of the string to be more specific. These contact are then queries until there are no more nodes to query. This makes it possible to find the nodes in the whole network that has the shortest distance to a particular string. Like all DHTs, this procedure is very efficient, typically O(log n) messages need to be sent, where is n is the number of nodes in the network and O denotes order.

By calculating a SHA-1 of the key it becomes possible to calculate which nodes in the network a particular key-value pair should be stored, and thus implement a distributed data repository where data is replicated in the network. In Bitverse, the value is represented as an unordered set, which makes it possible to store multiple values associated with a specific key. This special key-value(s) pair is called a SetMap. Below is an example of SetMap storing 5 values, identified by the key "hello".

"hello"=>{value2, value1, value5, value4, value3}
The SetMap provides a simple API, for example

```
setmap = bitverse.getSetMap("hello")
setMap.AddValue("value6")
```

The SetMap API can be used by the allocation agents to store registration data for a software container. The SetMap is also used internally in Bitverse to provide a messaging service. When an edge node connects to a super node, the super node will store IP number and UDP port of the super node as a value in a SetMap, where the self-generated SHA-1 id of the edge node is used as a key. This makes it possible for an edge node to send messages to any other edge node in the network, by allow the super nodes to use the information stored in the SetMap to set up tunnels between different super nodes.

Below is an example of a messaging API call to send a message to an edge node, where 4cd 7e1804bad 563d32a416df5f915efbbo13ee6f is the address of the receiving edge node.

```
bitverse.sendMessage("4cd7e1804bad563d32a416df5f915efbb013ee6f", "hello")
```

The message will then be sent to the connected super node, which will if necessary tunnel the message to a foreign super node where the receiving edge node is connected.

As used herein, the lookup key can be the checksum of the blueprint of a software container and the values are the Bitverse edge node addresses to the injected allocation agents executing on servers. Note that it would also be possible to use regular TCP or UDP to communicate with the allocation agents. Also, to authenticate the container allocator, in one embodiment, the container allocator uploads a public key to the allocation agents and signs outgoing messages from the container allocator.

FIG. 3 is a schematic drawing illustrating lifecycle of a software container of FIGS. 1 and 2. This is illustrated with reference to a video conference example. For other applications, other start parameters can be used.

A browser client 16 creates a new video conference room by sending a HTTP (Hypertext Transfer Protocol) request 26 to a web server 15. The web server 15 creates a room resource identified by a room ID either determined by the browser client 16 or the web server itself 15. The web server 15 then needs to acquire a standby software container and connect it to the video conferencing room resource it has created. In order to connect to the software container, the web server 15 comprises a client module 5, corresponding to the client 5 of FIG. 1. The details of the selection of software container is explained above with reference to FIG. 1 and is omitted here for reasons of clarity.

At the start of the process, there are three software containers: a first software container 2a, a second software container 2b and a third software container 2c, all in a standby state 20.

In this example, the first software container 2a is selected for the client module 5 of the web server 15. The web server 15 then sends 27 a start message containing a start parameter, in this example ROOM_ID=345, which causes the first software container 2a to transition 28 from the standby state 20 to a running state 21. While the first software container 2a is shown both in the standby state 20 and the running state 21 in FIG. 3, the first software container 2a (as for any of the software containers) is only in one state at any one time. The main process running in the first software container 2a is started with the start parameter, i.e. ROOM_ID=345, provided by the web server. In this way, the first software container 2a connects 29 to the correct room for the video conference, which is hosted by the web server 15 in this example.

Each software container can thus be in a state of not running (not shown), in a standby state 20 or in a running state 21, but only in one state at a time. Each software container can be allocated to only one session (or client) and after the client releases the software container, the execution of the software container ends and is not started again. However, the server (4 of FIG. 2) can start a new software container being an instance using the same or a different image file.

Figure 4A:
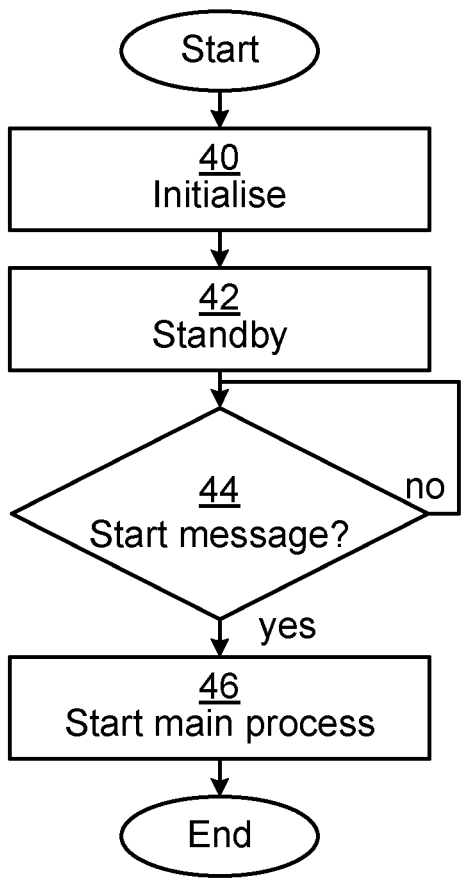
FIGS. 4A-B are flow charts illustrating embodiments of methods for managing lifecycle of a software container.
Figure 4B:
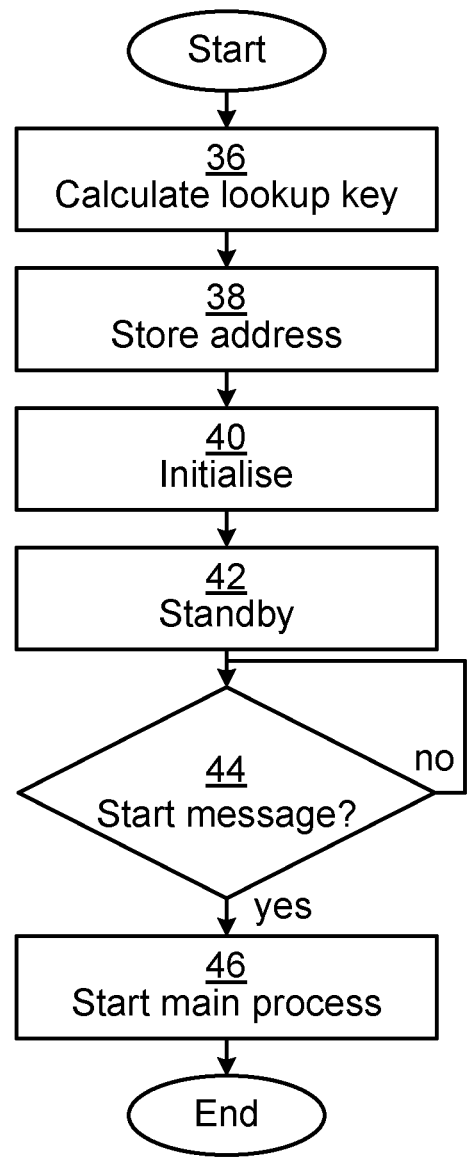

FIGS. 4A-B are flow charts illustrating embodiments of methods for managing a lifecycle of a software container. As explained above, the software container is announced in a distributed peer-to-peer repository, e.g. based on a distributed hash table. The method is performed in a server such as one or all of the servers of FIG. 1. The method is performed in a staging process being distinct from the main process. The staging process can be performed in the staging agent (10 of FIG. 2). The method is performed for each software container in each server.

In an initialise step 40, execution of the software container is initialised in the server. This can comprise downloading an image file for the main process when needed. The image file can be substantial in size, whereby the downloading of the image file can take seconds or even minutes. Once the initialisation is done, the software container can enter the standby state.

In a standby step 42, the software container enters a standby state, see 20 in FIG. 3. In this state, the software container is initialised and ready to be started.

In a conditional start message step 44, the server determines whether a start message for the software container has been received from a remote device, such as the client 5 of FIG. 1 (contained in the web server 15 of FIG. 3). When the start message is received, this comprises at least one start parameter for the software container. The start parameter is configuration data for the software container to find its specific role and function. In other words, the start parameter transforms the software container from a generic software container to a software container instance tailored for a specific context. The start parameter can be in a format of an environment variable, i.e. PARAMATER=VALUE. If the start message is received, the method continues to a start main process step. Otherwise, the method re-executes the conditional start message step 44, optionally after a delay (not shown). It is to be noted that this step can be implemented using a trigger, i.e. the method stops and only proceeds when the start message is received.

Alternatively, this step can be implemented using a polling process to poll whether the start message has been received or not.

In the start main process step 46, a main process of the software container is started. The software code for the main process was received prior to this step in the image file, e.g. in the initialise step 40. The at least one start parameter is applied for the main process. In this way, the software container progresses to a running state, see 21 of FIG. 3, while applying a configuration of the at least one start parameter.

As seen in FIG. 4A, the start main process step is only performed after the start message has been received.

Using this method, software containers can be initialised and set in a standby state, to prepare them and make the software containers ready to be started. Moreover, since the start parameter(s) are received in the start message, the software container can be configured to any suitable start configuration as the software container transitions from the standby state to the running state, when the main process is started. In this way, a pool of configuration neutral software containers can be initialised in advance, and configured when they are assigned.

Additionally, sensitive configuration data such as passwords or tokens can be arranged to not be easily accessible from external process. In contrast, if configuration for a software container is set using regular environment variables in the Dockerfile or via the Docker CLI (Command Line Interface), such configuration is easily accessible with 'docker inspect'/'docker commit' from other processes or via linked containers.

Looking now to FIG. 4B, only new or modified steps compared to the method illustrated by the flow chart of FIG. 4A will be described.

In a calculate lookup key step 36, a lookup key associated with the software container is calculated. The lookup key can e.g. be a checksum of a blueprint for the software container as described above. The blueprint can include or consist of metadata for the software container.

In a store address step 38, an address of the server is stored in association with the lookup key in the distributed peer-to-peer repository. This allows the server to be located based on the lookup key.

In a conditional mandatory parameters received step 45, the server determines whether a mandatory set of at least one start parameter has been received. If the mandatory set of at least one start parameter has been received, the method proceeds to the start main process step 46. Otherwise, the method re-executes the conditional mandatory parameters received step 45, optionally after a delay (not shown). In this way, the software container can be controlled to only be started once the predetermined mandatory set of start parameter(s) have been received.

Figure 5:
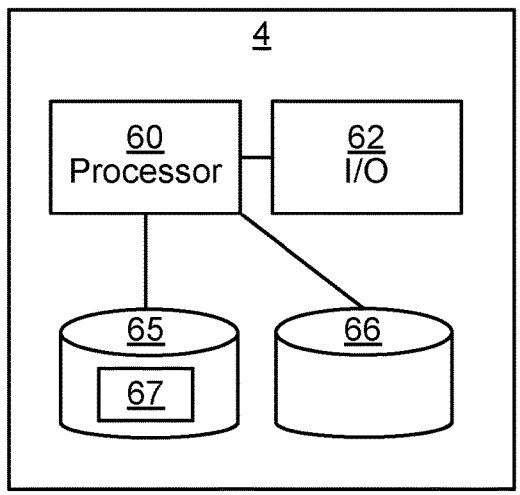
FIG. 5 is a schematic diagram illustrating components of the servers of FIG. 1.

FIG. 5 is a schematic diagram illustrating components of each one of the servers 4 of FIG. 1, here represented by a single server 4. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIGS. 4A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The server 4 further comprises an I/O interface 62 for communicating with other external entities. Optionally, the I/O interface 62 also includes a user interface.

Other components of the server 4 are omitted in order not to obscure the concepts presented herein.

Figure 6:
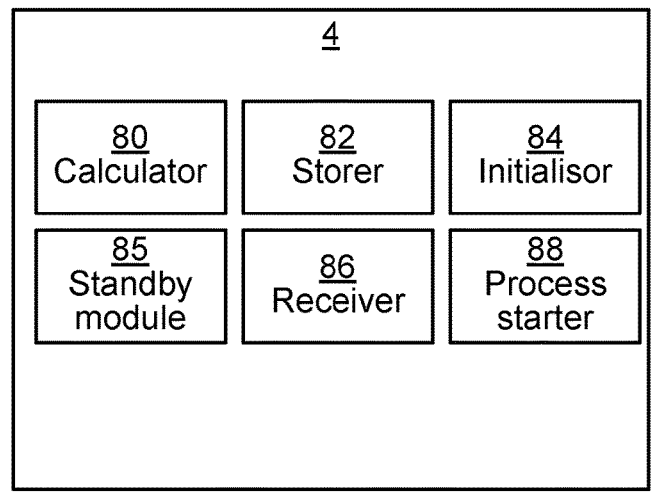
FIG. 6 is a schematic diagram showing functional modules of the server of FIG. 5 according to one embodiment.
Figure 7:
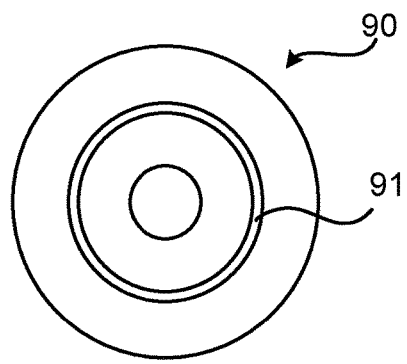
FIG. 7 shows one example of a computer program product comprising computer readable means.

FIG. 6 is a schematic diagram showing functional modules of the server 4 of FIG. 5 according to one embodiment. The modules are implemented using software instructions such as a computer program executing in the server. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

A calculator 80 corresponds to step 36. A storer 82 corresponds to step 38. An initialiser 84 corresponds to step 40. A standby manager 85 corresponds to step 42. A determiner 86 corresponds to steps 44 and 45. A process starter 88 corresponds to step 46.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for managing a lifecycle of a software container announced in a distributed peer-to-peer repository, the method being performed in a server, the method comprising the steps of:
    initializing execution of the software container in the server;
    setting the software container in a standby state;
    receiving a start message from a remote device, the start message comprising at least one start parameter for the software container; and
    starting a main process of the software container and applying the at least one start parameter for the main process, to progress the software container to a running state.

2. The method according to claim 1, wherein the step of initializing comprises downloading an image file for the main process when needed.

3. The method according to claim 1, wherein the step of starting the main process is performed after the step of receiving the start message.

4. The method according to claim 1, further comprising the steps of:
calculating a lookup key associated with the software container; and
storing an address of the server in association with the lookup key in the distributed peer-to-peer repository.

5. The method according to claim 1, wherein the distributed peer-to-peer repository is based on a distributed hash table.

6. The method according to claim 1, wherein the method is performed in a staging process being distinct from the main process.

7. The method according to claim 1, wherein the step of starting the main process is only performed once a mandatory set of at least one start parameter has been received.

8. A server for managing a lifecycle of a software container announced in a distributed peer-to-peer repository, the server comprising:
a processor; and
a memory storing instructions that, when executed by the processor, cause the server to:
initialize execution of the software container in the server;
set the software container in a standby state;
receive a start message from a remote device, the start message comprising at least one start parameter for the software container; and
start a main process of the software container and apply the at least one start parameter for the main process, to progress the software container to a running state.

9. The server according to claim 8, wherein the instructions to initialize comprise instructions that, when executed by the processor, cause the server to download an image file for the main process when needed.

10. The server according to claim 8, further comprising instructions that, when executed by the processor, cause the server to execute the instructions to start the main process after the instructions to receive the start message.

11. The server according to claim 8, further comprising instructions that, when executed by the processor, cause the server to:
calculate a lookup key associated with the software container; and
store an address of the server in association with the lookup key in the distributed peer-to-peer repository.

12. The server according to claim 8, wherein the distributed peer-to-peer repository is based on a distributed hash table.

13. The server according to claim 8, wherein the instructions are executed in a staging process distinct from the main process.

14. The server according to claim 8, wherein the instructions to start the main process comprise instructions that, when executed by the processor, cause the server to start the main process only once a mandatory set of at least one start parameter has been received.

15. A server comprising:
means for initializing execution of a software container in the server, the software container announced in a distributed peer-to-peer repository;
means for setting the software container in a standby state;
means for receiving a start message from a remote device, the start message comprising at least one start parameter for the software container; and
means for starting a main process of the software container and applying the at least one start parameter for the main process, to progress the software container to a running state.

16. A non-transitory computer-readable storage medium storing a computer program for managing a lifecycle of a software container announced in a distributed peer-to-peer repository, the computer program comprising computer program code that, when executed on a server, causes the server to:
initialize execution of the software container in the server;
set the software container in a standby state;
receive a start message from a remote device, the start message comprising at least one start parameter for the software container; and
start a main process of the software container and applying the at least one start parameter for the main process, to progress the software container to a running state.

* * * * *